April 11, 1950  C. E. CLAPPER  2,503,935
TRACTOR TOWING HITCH
Filed June 16, 1947
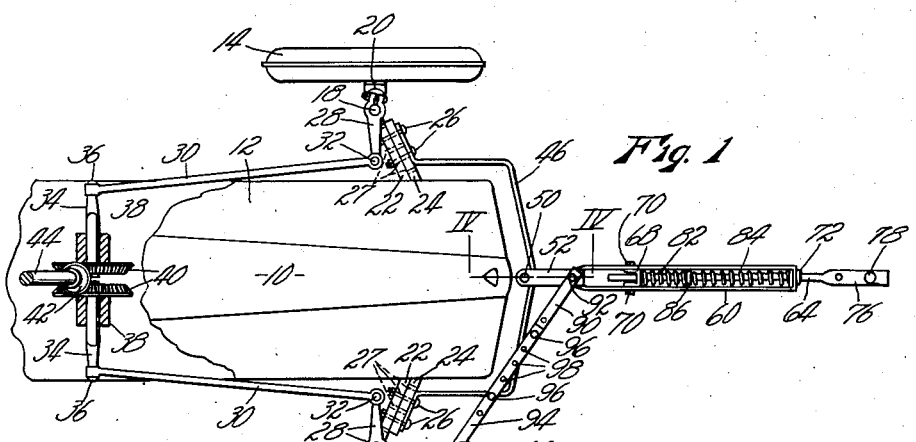
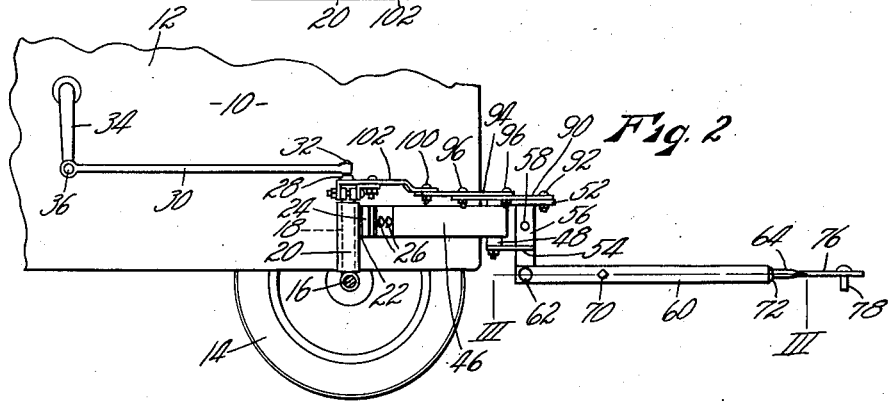
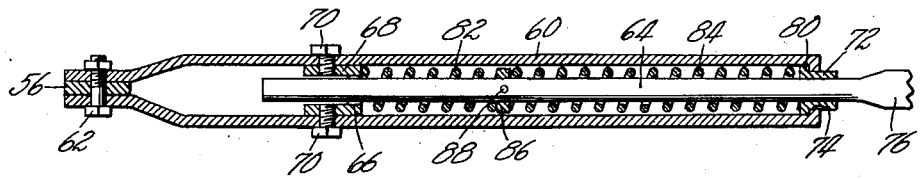
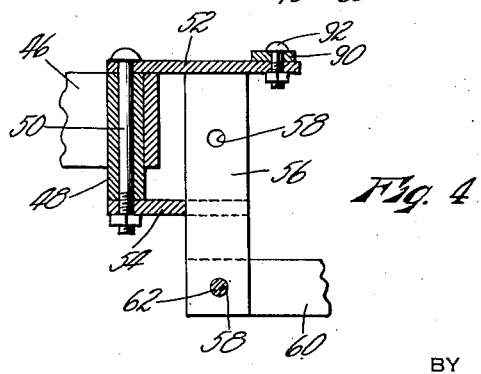
INVENTOR,
Clyde E. Clapper:
BY Roy E. Hamilton
ATTORNEY.

Patented Apr. 11, 1950

2,503,935

UNITED STATES PATENT OFFICE 2,503,935

TRACTOR TOWING HITCH

Clyde E. Clapper, Kansas City, Mo.

Application June 16, 1947, Serial No. 754,840

4 Claims. (Cl. 280—33.55)

This invention relates to new and useful improvements in a tractor towing hitch, and has particular reference to a tractor hitch suitable for drawing a tractor and steering the tractor to follow the towing vehicle.

The principal object of the present invention is the provision, in combination with a tractor having independently mounted front wheels operably connected through the steering gear of the tractor, of a tractor hitch adapted to be pivotally attached to a rigid portion of said tractor and operatively connected with one of said wheels, whereby when said hitch is pivotally moved both of said wheels will be turned.

Another object is the provision, in combination with a tractor of the class described having front wheels carried by the frame at independently adjustable distances from the center-line of the tractor, of a tractor hitch adapted to be pivotally attached to a rigid part of the tractor and operably connected with said wheels to cause the wheels to turn simultaneously with said hitch, said tractor hitch being adjustable to the various spacings of said wheels.

Still another object is the provision of a tractor hitch including a member attachable to a tractor, a member attachable to the towing vehicle, and springs connecting said members to cushion the force transmitted by said hitch, whether the tractor is being pulled or pushed.

Another object is the provision of a tractor hitch adapted to be mounted on or detached from the tractor rapidly and easily.

Other objects are simplicity and economy of construction, ruggedness, and dependability of operation.

With these objects in view, as well as other objects which will appear during the course of the specification, reference will now be had to the drawing, wherein—

Figure 1 is a fragmentary plan view of a tractor partially broken away, showing a tractor hitch embodying the present invention attached thereto.

Fig. 2 is a fragmentary side elevation of the parts shown in Figure 1, with one of the front tractor wheels removed.

Fig. 3 is an enlarged horizontal section taken on line III—III of Figure 2.

Fig. 4 is an enlarged fragmentary vertical section taken on line IV—IV of Figure 1.

Like reference characters apply to similar parts throughout the several views, and the numeral 10 applies to a tractor having a frame 12 supported at the forward end by front wheels 14. Each of said wheels is rotatably mounted on a horizontal stub shaft 16 rigidly fixed to the lower end of a substantially vertical shaft 18, said vertical shaft being carried for oscillation in a housing 20. Said housing is carried rigidly by an inwardly extending horizontal beam 22, said beam in turn being adjustably fixed to a beam 24 rigidly secured to frame 12 of the tractor by bolts 26. Thus it will be seen that the spacing of each wheel 14 from the center line of the tractor may be varied by inserting bolts 26 selectively in a series of holes 27 provided therefor in beams 22 and 24.

Each of shafts 18 extends above its housing 20, and to its extended end is rigidly fixed an inwardly extending substantially horizontal crank lever 28. A connecting rod 30 is pivotally connected at its forward end to the free end of each crank 28 by means of a pivot pin 32, and at its rearward end is pivotally connected to the free end of a crank 34 by means of a pivot pin 36. Referring to Figure 1, it will be seen that the two cranks 34 are carried co-axially in bearings 38. A beveled gear sector 40 is rigidly mounted on each of said cranks in opposing relation, both of said sections being engaged by a bevelled pinion 42 rigidly secured to steering post 44. Thus whenever steering post 44 is turned, cranks 34 will be turned in opposite directions, and acting through connecting rods 30 and opposed crank levers 28, will cause wheels 14 to turn in the same direction to steer the tractor. Beams 22 and 24 at each side of the tractor are disposed substantially at right angles to a line between pivot pin 36 and the average position of shaft 18, thereby permitting the wheels to be moved inwardly or outwardly as previously described without adjusting the lengths of connecting rods 30.

The structure thus far described is a standard type of tractor construction, the only purpose of its disclosure here being to furnish a foundation for applying a tractor hitch suitable for towing this type of tractor.

A substantially U-shaped frame 46 has its rearwardly extending ends rigidly fixed to beams 24 at each side of tractor frame 12 by means of bolts 26 or other suitable means. Said frame extends forwardly from tractor frame 12, and a vertical bearing sleeve 48 is welded or otherwise fixed to the inner surface of frame 46 substantially at the mid-point thereof. Said sleeve serves as a bearing for bolt 50, said bolt having forwardly extending horizontal bars 52 and 54 pivotally mounted thereon respectively at the upper and lower ends of sleeve 48. A vertical member 56, having vertically spaced holes 58 extending transversely therethrough, is welded or otherwise fixed to bars 52 and 54 forwardly of frame 46.

An elongated U-shaped member 60 is adapted to be pivotally connected at its open end to vertical bar 56 by inserting a bolt 62 selectively through any of holes 58. A pulling bar 64 is carried longitudinally in U-shaped member 60, being supported adjacent its rearward end in a hole 66 formed in a stop 68 removably fixed between the sides of member 60 by cap screws 70, and at its forward end in a sleeve 72 carried in a hole 74 formed in the forward end of member 60. The forwardly extended end portion 76 of pulling bar 64 is flattened and drilled to receive a pivot pin 78 by means of which said pulling bar may be pivotally attached to a towing vehicle. Hole 74 is larger than end portion 76 to permit easy assembly of the parts. Sleeve 72 is provided with an outwardly extending shoulder 80 adapted to bear against the inner surface of member 60.

A pair of helical springs 82 and 84 are carried on pulling rod 64 between stop 68 and sleeve 72, said springs being separated by a block 86 rigidly fixed to said pulling bar by pin 88. Thus a force tending to pull the tractor is transmitted from bar 64 to member 60 through spring 84, while a pushing force, as when backing, is transmitted from bar 64 to member 60 through spring 82. Since the forces exerted on the tractor are thus cushioned by said springs, both the tractor and the towing vehicle are protected from damage which would be caused by sudden starts and stops.

Bar 52 extends forwardly from vertical bar 56, and to its extended end a connecting rod section 90 is pivotally connected by means of bolt 92. Connecting rod section 94 is joined to section 92 by bolts 96. The connecting rod formed by sections 92 and 94 may be adjustably extended by inserting bolts 96 selectively in any of a series of longitudinally spaced apart holes 98 provided in said sections. The opposite end of rod section 94 is pivotally connected by a bolt 100 to a forwardly extending crank lever 102 rigidly fixed to crank lever 28 substantially at the upper end of shaft 18.

Thus, whenever a towing vehicle connected at the forward end of pulling bar 64 turns, bar 52 will be caused to pivot about bolt 56. This movement is transmitted by connecting rod sections 92 and 94 and crank lever 102 to shaft 18 carrying one of wheels 14, thereby causing said wheel to turn to follow the towing vehicle. This turning is in turn transmitted through the associated crank lever 28, connecting rod 30, crank 34, and gear sector 40 on one side of the tractor, and thence through pinion 42, gear section 40, crank 34, connecting rod 30, crank lever 28 and shaft 18 on the other side of the tractor, thus causing the other wheel 14 to turn coextensively with the first wheel.

When it is desired to change the wheel spacing as previously described, bolts 96 are removed from connecting rod sections 90 and 94 and reinserted in the proper holes 98 to provide a connecting rod of a length corresponding to the new wheel spacing.

By inserting bolt 62 selectively in any one of holes 58, member 60 and pulling bar 74 may be maintained substantially in a horizontal position regardless of the elevation of the hitch connection of the towing vehicle.

It is apparent that many minor changes in construction and arrangement of parts could be made without departing from the spirit of the invention. It is desired, therefore, to be limited only by the scope of the appended claims.

I claim:

1. The combination, with a tractor having two independently mounted front wheels each carried for oscillation on a vertical shaft to steer said tractor, said wheels being operably connected through the tractor steering gear, and being spaced at adjustably variable distances from the centerline of the tractor, of a tractor hitch comprising a pulling member adapted to be pivotally carried by a rigid portion of the tractor, a lever mounted co-axially with and adapted to move with said pulling member, a lever rigidly carried by the vertical shaft carrying one of said wheels, and a rod adjustably extendable in length to correspond to said variable wheel spacing operably connecting said two last named levers whereby when said pulling member is pivotally moved, said wheel will be turned correspondingly to steer the tractor, the other of said wheels being correspondingly turned through said tractor steering gear.

2. The combination, with a tractor having two independently mounted front wheels each carried for oscillation on a vertical shaft to steer said tractor, said wheels being operably connected through the tractor steering gear, and being spaced at adjustably variable distances from the centerline of the tractor, of a tractor hitch comprising a resiliently compressible and extendable pulling member adapted to be pivotally carried by a rigid portion of the tractor, a lever mounted coaxially with and adapted to move with said pulling member, a lever rigidly carried by the vertical shaft carrying one of said wheels, and a rod adjustably extendable in length to correspond to said variable wheel spacing operably connecting said two last named levers whereby when said pulling member is pivotally moved, said wheel will be turned correspondingly to steer the tractor, the other of said wheels being correspondingly turned through said tractor steering gear.

3. In a tractor hitch of the class described having a pulling member adapted to be pivotally carried by a rigid portion of said tractor, a pulling member comprising an elongated U-shaped member adapted to be pivotally carried at its open end by said tractor, a pulling bar disposed longitudinally in said U-shaped member and carried for sliding movement in spaced apart bearing members fixed in said U-shaped members, the forwardly extended end of said bar being adapted to be connected to a towing vehicle, a block fixed to said pulling bar intermediate said bearing members, and a spring carried on said bar between said block and each of said bearing members.

4. In a tractor hitch of the class described having a pulling member adapted to be pivotally carried by a rigid portion of said tractor, a pair of vertically spaced apart horizontal bars pivotally attached to said rigid tractor portion for movement in a horizontal plane and extending forwardly therefrom, and a vertical member rigidly fixed to said horizontal bars adjacent their forward ends, said vertical member having a plurality of vertically spaced apart holes formed therethrough whereby said pulling member may be pivotally connected to said vertical member for movement in a vertical plane.

CLYDE E. CLAPPER.

REFERENCES CITED

The following references are of record in the file of this patent:

UNITED STATES PATENTS

| Number | Name | Date |
|---|---|---|
| 1,408,895 | Lamoreaux et al. | Mar. 7, 1922 |
| 1,450,759 | Snyder | Apr. 3, 1923 |
| 1,827,832 | Andreasen | Oct. 20, 1931 |
| 2,201,141 | Kitterman | May 21, 1940 |
| 2,394,207 | Roth | Feb. 5, 1945 |